US005471562A

United States Patent [19]

Shibata et al.

[11] Patent Number: 5,471,562

[45] Date of Patent: Nov. 28, 1995

[54] PRINTER HAVING A BIT SHIFT FUNCTION

[75] Inventors: Kouichi Shibata, Sakai; Yusuke Morikawa, Shijohnawate; Ikuhiro Ohmi, Osaka, all of Japan

[73] Assignee: Mita Industrial Co., Ltd., Osaka, Japan

[21] Appl. No.: 907,619

[22] Filed: Jul. 2, 1992

[30] Foreign Application Priority Data

Jul. 11, 1991 [JP] Japan .................................... 3-198843

[51] Int. Cl.[6] .................................................. G06F 3/14

[52] U.S. Cl. .............................................................. 395/101

[58] Field of Search ............................. 395/86, 110, 127, 395/138, 152, 109, 105, 375, 162; 364/900

[56] References Cited

U.S. PATENT DOCUMENTS 4,779,223 10/1988 Asai et al. .............................. 364/900
4,829,460 5/1989 Ito ...................................... 364/715.08
4,905,091 2/1990 Suzuki et al. ........................... 358/296
4,931,970 6/1990 Cook et al. ........................ 364/715.05
5,099,435 3/1992 Collins et al. .......................... 364/518
5,148,517 9/1992 Suzuki et al. ........................... 395/115
5,276,800 1/1994 Wada ...................................... 395/162
5,301,345 4/1994 Shruhak et al. ........................ 395/375
5,317,200 5/1994 Nishiyama .............................. 307/262

*Primary Examiner*—Mark R. Powell
*Assistant Examiner*—Gabriel Garcia
*Attorney, Agent, or Firm*—Beveridge, DeGrandi Weilacher & Young

[57] ABSTRACT

A source data latch circuit for latching data which are read-in from a DRAM is provided. A data latch circuit for latching one-byte data generated by a CPU and an overflowing bit storing circuit for storing overflowing data through a three-bit shift are provided. At a composing circuit, data latched by the latch circuit at a previous time and stored in the overflowing bit storing circuit and the present data latched by the latch circuit are composed. At an OR circuit, the composed data and data with respect to which an OR is obtained are written into RAM.

8 Claims, 5 Drawing Sheets

PRINTER HAVING A BIT SHIFT FUNCTION

BACKGROUND OF THE INVENTION

1. Field of the Invention

The present invention relates to a printer, and more specifically, to a printer, such as a laser printer, capable of bit shifting.

2. Description of the Prior Art

In writing font data or image data into the bit map memory of laser printers, a slight writing adjustment is made by a shift per dot. Such an adjustment is required, for example, in a case where a user intends to change character spacing or to draw a character or a line at a position intended by the user.

Conventionally, the per-bit adjustment for making such a writing adjustment has been made by a bit shift such as a right shift, a left shift or a circular shift, by use of a CPU (central processing unit). The bit map memory is a memory where a virtual page or a part thereof is formed in a memory area where image information is stored so that one bit corresponds to one dot.

The above-described bit shift operation for performing the bit shift is performed by shifting image data read into a register to the left or right in response to a bit shift instruction by the CPU, and by storing an overflowing bit in a memory.

FIG. 4A shows an image "A" which is represented by 8 bits with respect to one direction which image is data stored in a font ROM (read only memory). An operation for transferring this image to the bit map memory will be considered. Generally, data can be stored in the CPU only in 8 bit, 16 bit or 32 bit strings. Therefore, in a case where the image "A" is to be shifted to the right by 3 bits beyond the 8-bit limit, first, the left 5 bits of the 8 bits of the image "A" are shifted to the right by 3 bits. Then, the remaining 3 bits are written onto the first portion of the succeeding 8 bit string.

As described above, in laser printers, the per-bit adjustment has conventionally been made according to the image position in response to a bit shift operation instruction of the CPU when image data formed by the CPU is written onto the bit map memory.

However, the above-described per-bit adjustment, which is made in response to the bit operation instruction of the CPU, requires a large amount of time. As a result, the processing capability (performance) of the printer deteriorates. The reason why the above adjustment takes time is that it takes time for the CPU to perform the bit shift operation, and that all or most of the procedures involved therewith are executed by software. For example, in the bit shift of FIG. 4A, two operations are required where 5 bits and 3 bits are separately read out from a register, in which an 8-bit image data is written, and where the read-out bits are shifted and written in the bit map memory. Because of this, the bit operation takes a large amount of time. Moreover, in case where a logical operation (e.g. OR operation) with an image data previously stored in the memory is performed, it takes a large amount of time to read-in the previously-stored image data in writing a new image data.

SUMMARY OF THE INVENTION

An object of the present invention is to provide a printer with a high speed processing capability where the operation of the CPU due to software is reduced.

According to a feature of the present invention, in a printer provided with shift means for executing processing of image data on a per word basis which image data consists of a predetermined number of bits, to provide bit map memory data obtained through a shift process. Said shift means comprising storing means for storing at least one of the bits constituting the word which one bit overflows toward a succeeding word, and composing means for composing remaining bits of the word and an overflowing bit of a preceding word which is stored in the storing means, in order to output composed image data.

According to such an arrangement, since image data formed by the CPU is provided to the bit map memory in a bit-shifted condition by the storing means and the composing means, the working load of the CPU due to software is reduced.

BRIEF DESCRIPTION OF THE DRAWINGS

This and other objects and features of this invention will become clear from the following description taken in conjunction with the preferred embodiments with reference to the accompanied drawings in which.

DETAILED DESCRIPTION OF THE PREFERRED EMBODIMENTS

An embodiment of the present invention will hereinafter be described with reference to the drawings.

Figure 2:
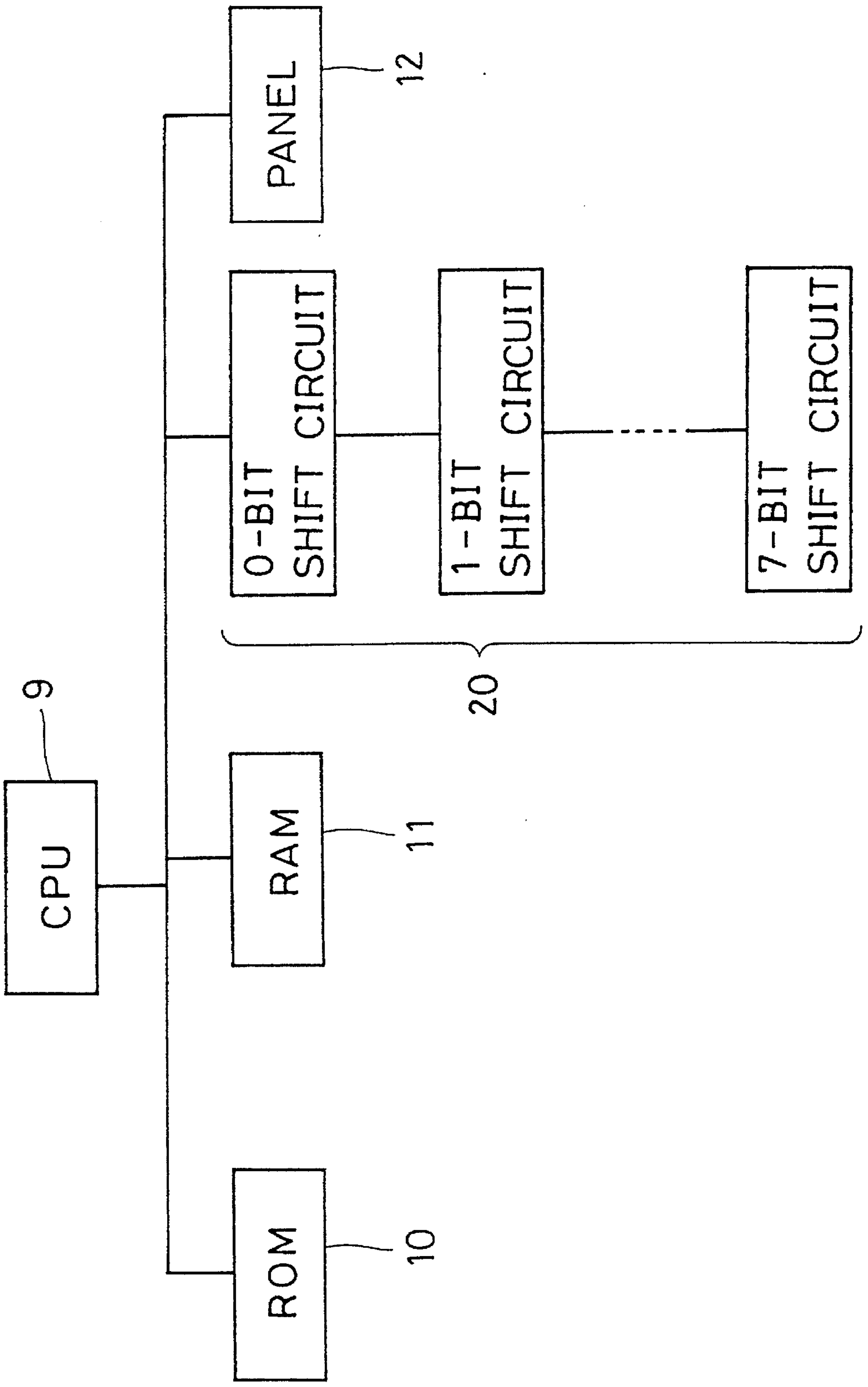
FIG. 2 is a view showing a system arrangement of the embodiment of the present invention.

As shown in FIG. 2, the present invention chiefly includes a CPU 9 for controlling each unit, a ROM 10 and a RAM (random access memory) 11 provided as memories, a panel 12 used for operation and 0 to 7-bit shift circuits 20 for the per-bit adjustment.

Since 8 bits are used as a unit, considering a case where a bit is not shifted and a case where 7 bits are shifted, the 0 to 7-bit shift circuits 20 consists of eight different shift circuit blocks, each of which corresponds to each of the bit shifts. The CPU 9 chooses a shift block in accordance with the number of bits to be shifted.

Figure 1:
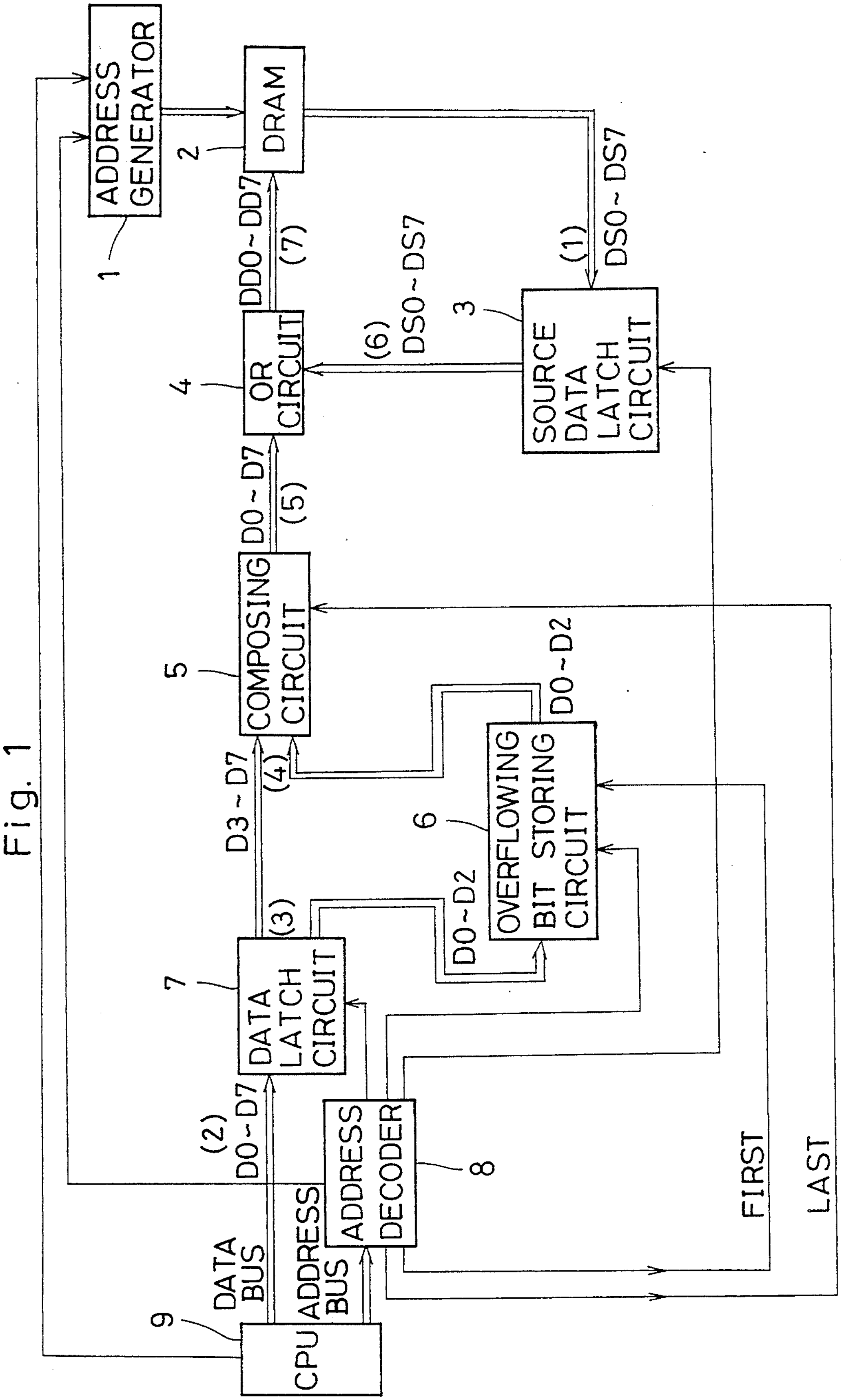
FIG. 1 is a block diagram showing an arrangement of a 3-bit shift circuit of an embodiment of the present invention.
Figure 3:
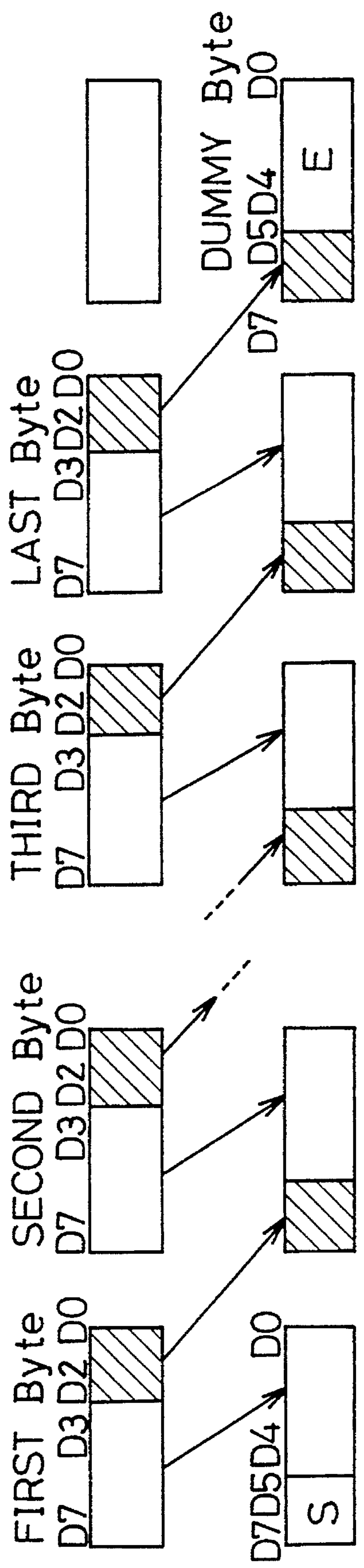
FIG. 3 is a view showing a 3-bit shift of the embodiment of the present invention.

FIG. 1 shows the arrangement of a 3-bit shift circuit block of the circuits 20. The shift circuit blocks have the same arrangement except that each of them has a different bit number to be shifted. FIG. 3 shows a manner of a 3-bit shift. In the upper part of the figure, new image data formed by the CPU 9 are shown, while in the lower thereof, image data obtained through a 3-bit shift by using a composing circuit 5 (FIG. 1) is shown. FIG. 3 shows a shift by one line of an image. Such a shift is successively made with respect to all each of the lines which make up an image. In this embodiment, a description will be given assuming that one line consists of five words (one words consists of 8 bytes).

This embodiment is designed so that two image data are outputted after being overlapped with each other through a logical OR operation. That is, source data (a first image, e.g. image data representing picture) previously written in a DRAM (dynamic random access memory) and image data (a second image, e.g. image data representing letters) obtained through a bit shift, are merged into one image (a image data representing the picture and letters merged), and written in the DRAM 2. The image data is read out from the DRAM 2 and printed by the image forming section (not shown).

The 3-bit shift will hereinafter be described along the data flow (1) to (7). The other bit shifts are performed by the other circuit blocks in a similar manner.

At (1), first image data DS0 to DS7 are read out from the DRAM 2 according to data from an address generator 1 and the CPU 9, and latched in a source data latch circuit 3. This is in order to OR-write it with the second image data at an OR circuit 4 at subsequently-described flows (5) and (6). The address generator 1, which is connected to an address decoder 8 through an address bus as well as to the CPU 9 through a data bus, reads out data from the DRAM (bit map memory) 2 based on data from the CPU 9 and the address decoder 8 and writes onto a predetermined address of the DRAM 2 image data from the OR circuit 4.

At (2), the second image data D0 to D7 are latched directly in a data latch circuit 7. The address decoder 8 outputs an instruction signal, such as a latch instruction signal, and store instruction signal based on address data transmitted from the CPU 9 through an address bus. The data latch circuit 7 latches the second image data D0 to D7 based on a latch instruction signal from the address decoder 8.

At (3), the last 3 bits of the second image data which bits overflow through the bit shift, that is, overflowing bit data D0 to D2 are stored in an overflowing bit storing circuit 6 in order to write them in the next byte.

Figure 5:
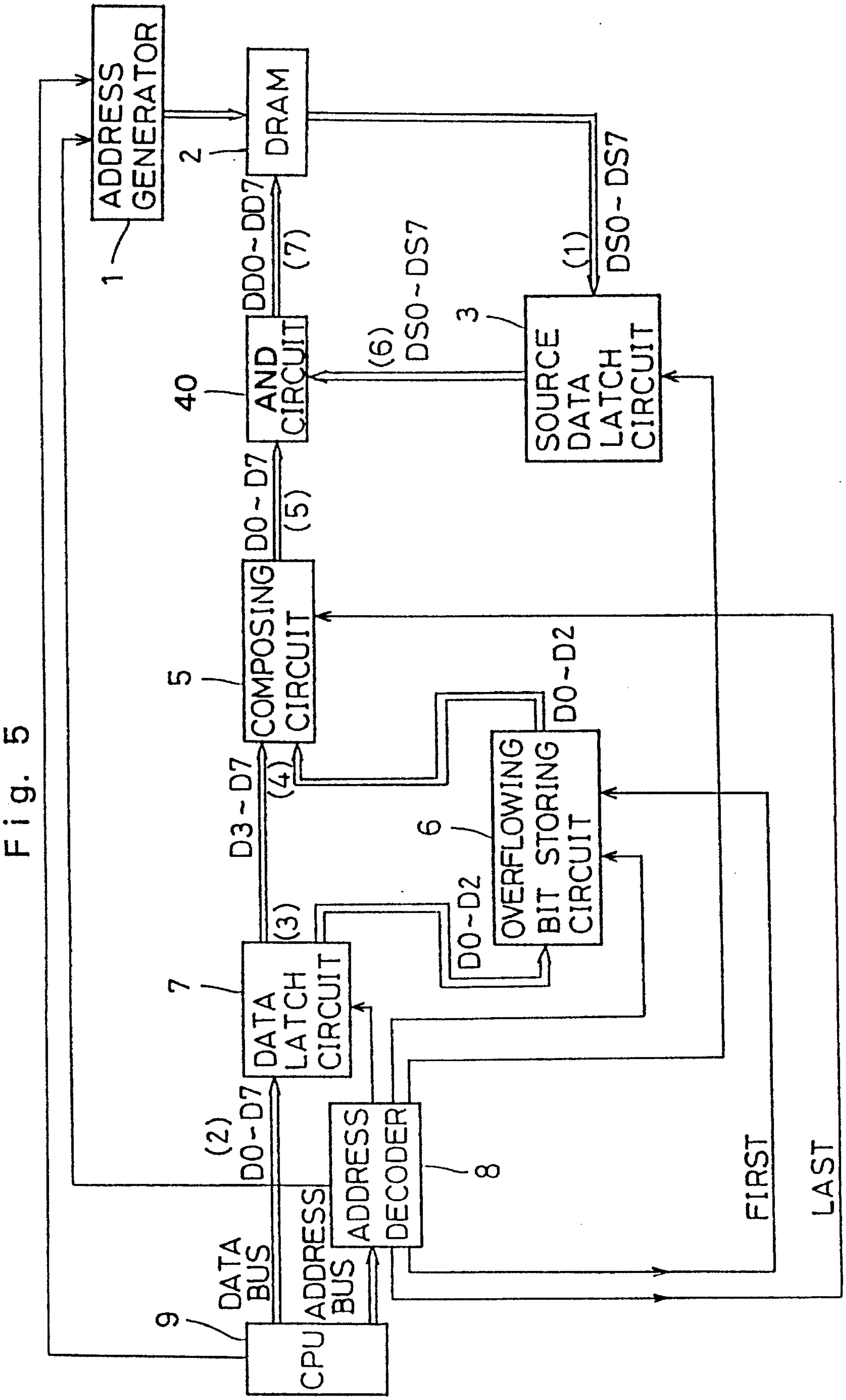
FIG. 5 shows an AND circuit to be used in place of the OR circuit in FIG. 1.

At (4), the first 5 bits of the second image data which bits remain after the bit shift, that is, the remaining bit data D3 to D7 and the overflowing bit data D0 to D2 of a preceding bit shift, are composed to form a byte of new second image data D0 to D7 as shown in FIG. 5.

With respect to all the bytes transmitted, however, it is necessary to prevent them from being influenced by the transmitted second image data in order to prevent the high-order three bits (shown by S in FIG. 3) of the first byte and the low-order 5 bits (shown by E in FIG. 5) of the byte (dummy byte) subsequent to the last byte from influencing the first image data in a subsequently-described OR writing. For this purpose, as shown in FIG. 1, all of data D5 to D7 are set to 0 by a "first" signal in a shift process of the first word (first byte) of one line, and data D0 to D4 are set to 0 by a "last" signal in a shift process of the last word of the line. In a case where the first and second image data are AND-written by use of an AND circuit 40 shown in FIG. 5 instead of the previously described OR circuit, a 1 is inserted into the S and E portions.

The "first" and "last" signals are provided by the address decoder 8. The address decoder 8 generates these signals when the CPU 9 provides a specific instruction. Since the S portion relates to the overflowing bits, the "first" signal is provided to the overflowing bit storing circuit 6, where D5 to D7 are set to 0. On the other hand, since the E portion relates to the remaining bits, the "last" signal is provided to the composing circuit 5, where D0 to D4 are set to 0.

At (5) and (6), the new second image data D0 to D7 composed at (4) are read out from a destination memory area of the composing circuit 5, and OR of the second image data D0 to D7 and the first image data DS0 to DS7 latched at (1) is obtained at the OR circuit 4 to form the third image data DD0 to DD7. The previously-described operation of latching the first image data at (1) is completed by the time D0 to D7 are outputted from the composing circuit 5.

At (7), the third image data DD0 to DD7 is written into the DRAM 2. At this time, the data is written at a position on the bit map memory which position is instructed by the address generator 1, that is, at an address position the same as that specified at (1). After the transmission of the last byte is completed, the dummy byte is written in the E portion of FIG. 3 to complete the bit shift of one line of image data.

Figure 4A:
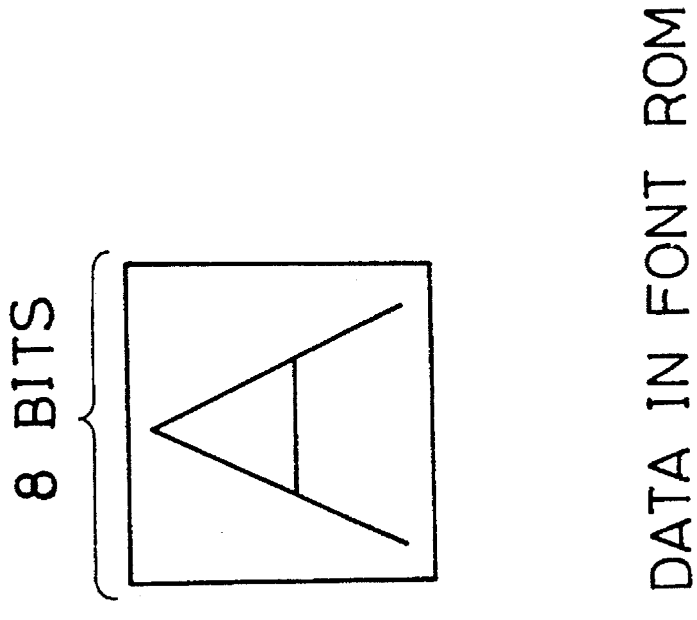
FIG. 4A shows a data in a font ROM of a prior art and the embodiment of the present invention.
Figure 4B:
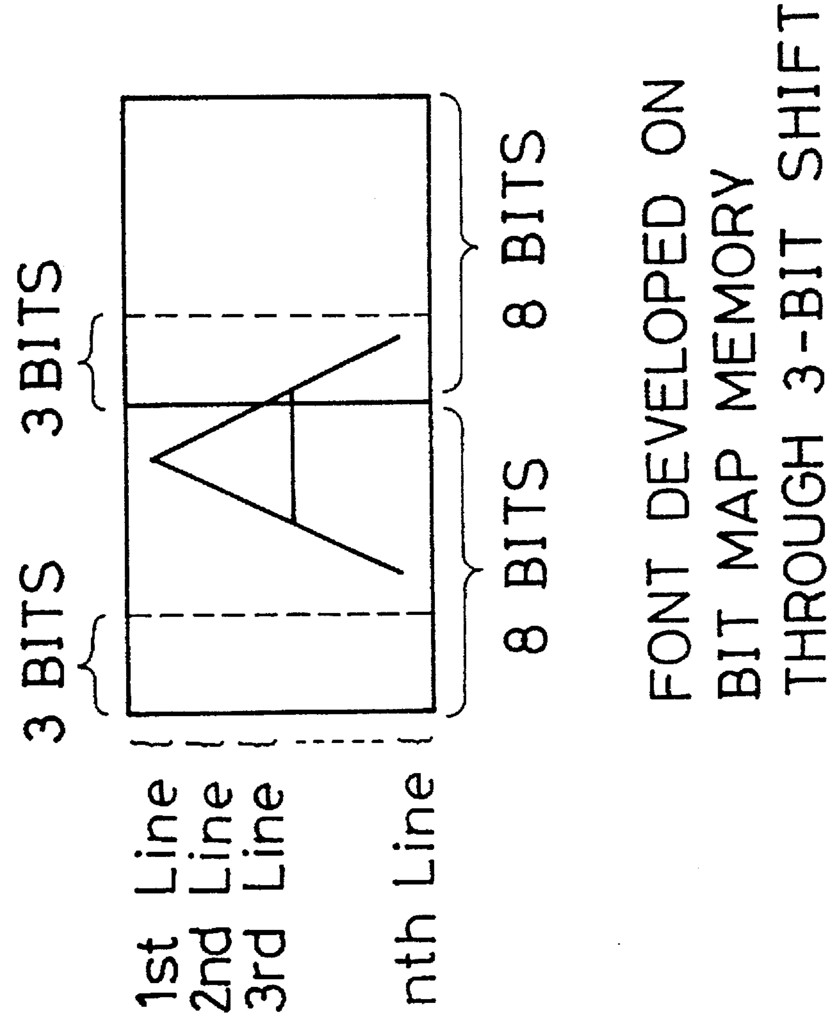
FIG. 4B shows a font developed on a bit map memory through the 3-bit shift.

An operation similar to the above-described operation is successively performed with respect to succeeding lines. When the bit shift operation is completed with respect to all the lines, a shift of an image is completed. It should be noted that the width (i.e. a longitudinal length of FIG. 4B) of each line corresponds to one dot size of the image.

As described above, according to the present embodiment, an image data word provided by the CPU 9 consisting of 8 bits is latched by the data latch circuit 7, the overflowing bits which overflow toward the succeeding word through the bit shift are temporarily stored in the storing circuit 6, and the remaining bits provided by the latch circuit 7, and the overflowing bits of the preceding word which bits are provided by the storing circuit 6, are composed by the composing circuit 5. Thereby, the bit shift is made. The image data obtained is written into the DRAM 2.

Obviously, many modifications and variations of the present invention are possible in light of the above teaching. It is therefore to be understood that within the scope of the appended claims, the invention may be practiced other than as specifically described.

What is claimed is:

1. A printer comprising:

a shift means for processing image data on a per word basis, wherein said image data consist of a predetermined number of bits in an order; and a bit map memory for receiving image data from said shift means after a shift process by said shift means, said shift means including storing means for storing at least one bit of a bit string constituting a word, which at least one bit overflows into a succeeding word; and composing means for composing remaining bits of said word, and at least one overflowing bit from a word previously stored in said storing means, in order to output composed image data, said image data received by said bit map memory being based upon said composed image data.

2. A printer according to claim 1, further comprising:

a second storing means for storing predetermined image data; and logical operation means for performing a logical operation in order to merge said predetermined image data stored in said second storing means, and said composed image data, to provide logical output data as said image data to said bit map memory.

3. A printer according to claim 2, wherein said second storing means is said bit map memory.

4. A printer according to claim 1, further including a plurality of shift means, wherein each of said plurality of shift means performs a predetermined number Of bit shifts, and wherein each of said plurality of shift means performs a different number of bit shifts than another of said plurality of shift means.

5. A printer according to claim 1, wherein one line of image data is represented by a plurality of words, and wherein means are provided for setting, in the shift process of a first word of said one line, a bit located at a position where the overflowing bit of the preceding word is to be inserted, to a specified value, and for setting, in the shift process of a last word of said one line, a bit located at a position other than said position where the overflowing bit of the preceding word is to be inserted to the specified value.

6. A printer according to claim 5, wherein said specified value is a digital "0" value, and wherein said shift means further comprises:

a second storing means for storing predetermined image data; and a logical OR circuit for performing a logical operation in order to merge said predetermined image data stored in said second storing means, and said composed image data, to provide logical output data as said image data to said bit map memory.

7. A printer according to claim 5, wherein said specified value is a digital "1" value, and wherein said shift means further comprises:

a second storing means for storing predetermined image data; and a logical AND circuit for performing a logical operation in order to merge said predetermined image data stored in said second storing means, and said composed image data, to provide logical output data as said image data to said bit map memory.

8. A printer according to claim 5, further including a plurality of shift means, wherein each of said plurality of shift means performs a dedicated number of bit shifts, and wherein each of said plurality of shift means performs a predetermined number of bit shifts than another of said plurality of shift means.

* * * * *